(12) United States Patent
Vinski

(10) Patent No.: US 9,840,938 B1
(45) Date of Patent: Dec. 12, 2017

(54) HOUSING FOR BEARING CAVITY IN A GAS TURBINE ENGINE

(71) Applicant: PRATT & WHITNEY CANADA CORP., Longueuil (CA)

(72) Inventor: Johnny Vinski, Châteauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/371,311

(22) Filed: Dec. 7, 2016

(51) Int. Cl.
| *F16C 37/00* | (2006.01) |
| *F01D 25/08* | (2006.01) |
| *F01D 25/16* | (2006.01) |
| *F16C 19/52* | (2006.01) |
| *F16C 35/04* | (2006.01) |

(52) U.S. Cl.
CPC ............ *F01D 25/08* (2013.01); *F01D 25/16* (2013.01); *F16C 19/525* (2013.01); *F16C 35/045* (2013.01); *F16C 37/007* (2013.01); *F05D 2220/32* (2013.01); *F05D 2240/24* (2013.01); *F05D 2240/60* (2013.01); *F05D 2260/231* (2013.01); *F16C 2360/23* (2013.01)

(58) Field of Classification Search
CPC .. F16C 35/045; F16C 37/007; F16C 2360/23; F01D 25/08; F05D 2260/23
See application file for complete search history.

(56) References Cited

U.S. PATENT DOCUMENTS

| 4,542,623 A * | 9/1985 | Hovan .................. F01D 25/125 165/51 |
| 4,709,545 A * | 12/1987 | Stevens .................. F01D 11/00 60/39.08 |
| 5,622,438 A * | 4/1997 | Walsh .................. F01D 25/162 384/624 |
| 8,308,431 B2 | 11/2012 | Ueno et al. |
| 2015/0044037 A1 | 2/2015 | Bucking et al. |
| 2016/0047422 A1* | 2/2016 | Duffy ....................... F02C 7/06 384/467 |
| 2016/0281779 A1* | 9/2016 | Saadi ...................... F01D 25/16 |

* cited by examiner

*Primary Examiner* — Thomas R. Hannon
(74) *Attorney, Agent, or Firm* — Norton Rose Fulbright Canada LLP

(57) ABSTRACT

A housing for a bearing cavity in a gas turbine engine is disclosed. The housing comprise features that mitigate heat transfer from a heat source in the gas turbine engine to the nearby bearing cavity to prevent exposing the oil in the bearing cavity to excessively high temperatures. The housing comprises an annular flange that defines one or more barriers to heat transfer from the heat source to the bearing cavity.

20 Claims, 4 Drawing Sheets

HOUSING FOR BEARING CAVITY IN A GAS TURBINE ENGINE

TECHNICAL FIELD

The disclosure relates generally to mitigating heat transfer to a bearing cavity in a gas turbine engine, and more particularly to a housing of a bearing cavity in a gas turbine engine.

BACKGROUND OF THE ART

During operation of a gas turbine engine or when such engine has just been shut down, some components of the engine can reach relatively high temperatures and heat from such components can be transferred to other nearby components of the engine. When such heat is transferred to a bearing cavity containing a bearing and oil for lubricating and cooling the bearing, the oil inside the bearing cavity can be susceptible to breakdown and coking if temperatures become too elevated. The exposure of the oil to such elevated temperatures can reduce the life of the oil.

SUMMARY

In one aspect, the disclosure describes a gas turbine engine comprising a housing for a bearing cavity having a bearing rotatably supporting a shaft having a rotational axis, the housing having a wall extending generally radially relative to the rotational axis with an inner surface facing an interior of the bearing cavity and an outer surface in use facing an engine heat source, the housing having an annular flange including:

a first flange wall extending generally radially and being axially spaced apart from the radial housing wall relative to the rotational axis to define a first space between the radial housing wall and the first flange wall;

a second flange wall extending generally radially and being axially spaced apart from first flange wall relative to the rotational axis to define a second space between the first flange wall and the second flange wall; and a thermally conductive junction between the second flange wall and the first flange wall, the junction being disposed at a radially inner end of the second space to define a conductive heat transfer path between the second flange wall and the first flange wall.

The second space may be circumferentially continuous about the rotational axis.

A portion of the second space may have an axial cross-sectional profile that is circumferentially uniform about the rotational axis.

A portion of the first space may have an axial cross-sectional profile that is circumferentially uniform about the rotational axis.

The radial housing wall and the flange may together define a generally s-shaped axial cross-sectional profile.

The radial housing wall and the first flange wall may be joined via a joining wall that is generally parallel to the rotational axis.

The junction may comprise a joining wall extending between the second flange wall and the first flange wall.

The junction may be circumferentially continuous about the rotational axis.

The heat source may be a turbine disk.

The gas turbine engine may comprise a heat shield being axially spaced apart from the second flange wall to define a third space between the second flange wall and the heat shield.

Embodiments may include combinations of the above features.

In another aspect, the disclosure describes a housing for a bearing cavity in a gas turbine engine where the bearing cavity has a bearing rotatably supporting a shaft having a rotational axis, the housing having a housing axis corresponding to the rotational axis, the housing mitigating heat transfer to the bearing cavity from a heat source disposed axially from the bearing cavity relative to the housing axis during use. The housing comprises:

a wall extending generally radially relative to the housing axis, the radial housing wall having an inner surface facing an interior of the bearing cavity and an outer surface facing toward the heat source during use; and an annular flange, the flange comprising:

a first flange wall extending generally radially and being axially spaced apart from the radial housing wall relative to the housing axis to define a first space between the radial housing wall and the first flange wall;

a second flange wall extending generally radially and being axially spaced apart from the first flange wall relative to the housing axis to define a second space between the first flange wall and the second flange wall; and a thermally conductive junction between the second flange wall and the first flange wall, the junction being disposed at a radially inner end of the second space to define a conductive heat transfer path between the second flange wall and the first flange wall.

The second space may be circumferentially continuous about the housing axis.

A portion of the second space may have an axial cross-sectional profile that is circumferentially uniform about the housing axis.

A portion of the first space may have an axial cross-sectional profile that is circumferentially uniform about the housing axis.

The radial housing wall and the flange may together define a generally s-shaped axial cross-sectional profile.

The conductive heat transfer path may extend continuously through the flange from the second flange wall to the radial housing wall.

The radial housing wall and the first flange wall may be joined via a joining wall that is generally parallel to the housing axis.

The junction may comprise a joining wall extending between the second flange wall and the first flange wall.

The first flange wall may be generally axisymmetric about the housing axis.

The junction may be circumferentially continuous about the housing axis.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The present disclosure relates to a housing for a bearing cavity in a gas turbine engine. In various embodiments, the housing may comprise features that mitigate heat transfer from a heat source in the gas turbine engine to the nearby bearing cavity to prevent overly high temperatures of one or more walls of the housing defining the bearing cavity. For example, the housing may comprise a housing wall having a generally radial wall portion relative to an axis and an annular flange extending from the housing wall. In various embodiments, the annular flange may define one or more barriers to heat transfer. For example, the annular flange may define a relatively long (e.g., and tortuous) conductive heat transfer path to the housing wall and also define one or more spaces that hinder the heat transfer to the housing wall.

In various embodiments, the configuration of the housing disclosed herein may reduce heat transfer by conduction, convection, and/or radiation from the heat source to the bearing cavity. Having the bearing cavity and its housing walls at a lower temperature may reduce or eliminate the risk of overheating the oil inside the bearing cavity. The features of the housing disclosed herein may be configured to make efficient use of space so as to be relatively compact.

Aspects of various embodiments are described through reference to the drawings.

Figure 1:
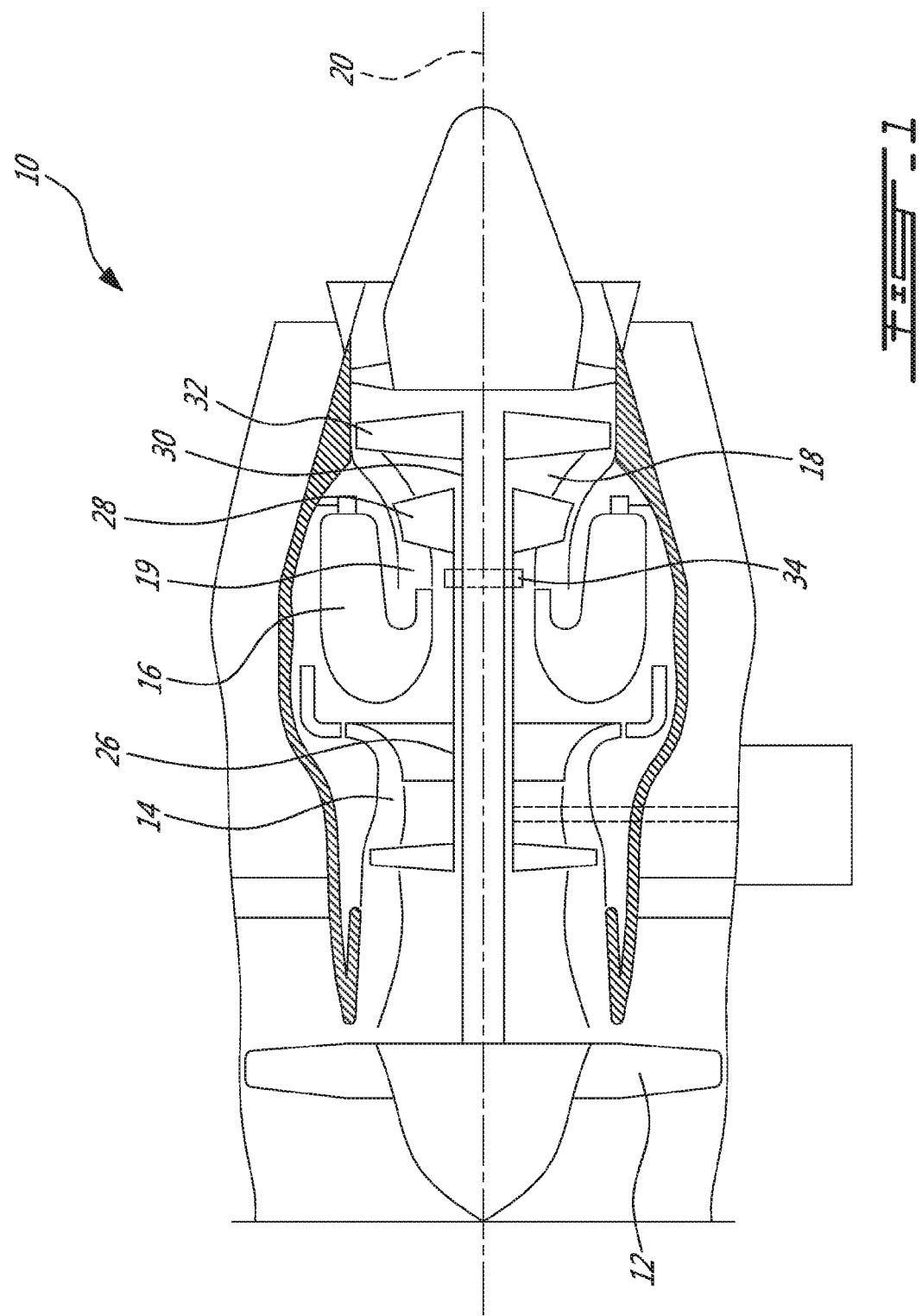
FIG. 1 is a schematic axial cross-section view of an exemplary gas turbine engine.

FIG. 1 is a schematic axial cross-section view of an exemplary gas turbine engine 10. Gas turbine engine 10 may be of a type preferably provided for use in subsonic flight, generally comprising, in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. In some embodiments, gas turbine engine 10 may suitable for mounting to and propelling an (e.g., fixed-wing or rotary wing) aircraft. Alternatively, gas turbine engine 10 may be configured as an auxiliary power unit (APU) for use on an aircraft, or, gas turbine engine 10 may be used for a ground-based industrial application such as power generation.

In various embodiments, gas turbine engine 10 may have a dual-spool configuration but it is understood that gas turbine engine 10 may not be limited to such configuration. For example, gas turbine engine 10 may comprise high-pressure spool 26 including one or more stages of multistage compressor 14 and one or more high-pressure turbines 28 of turbine section 18. Gas turbine engine 10 may also comprise low-pressure spool 30 including one or more stages of multistage compressor 14 and one or more low-pressure (i.e. power) turbines 32 of turbine 18. Low-pressure spool 30 may be drivingly coupled to fan 12.

Gas turbine engine 10 may comprise a rotational axis 20. In some embodiments, rotational axis 20 may correspond to an axis of rotation of fan 12. For example, rotational axis 20 may correspond to an axis of rotation of high-pressure spool 26 and low-pressure spool 30 of gas turbine engine 10. In some embodiments, rotational axis 20 may correspond to a central axis of gas turbine engine 10.

Gas turbine engine 10 may comprise one or more bearings 34 suitable for rotatably supporting a shaft (e.g., of high-pressure spool 26 or low-pressure spool 30) for rotation about rotational axis 20 or some other axis. In some embodiments, bearings 34 may be roller bearings.

Figure 2:
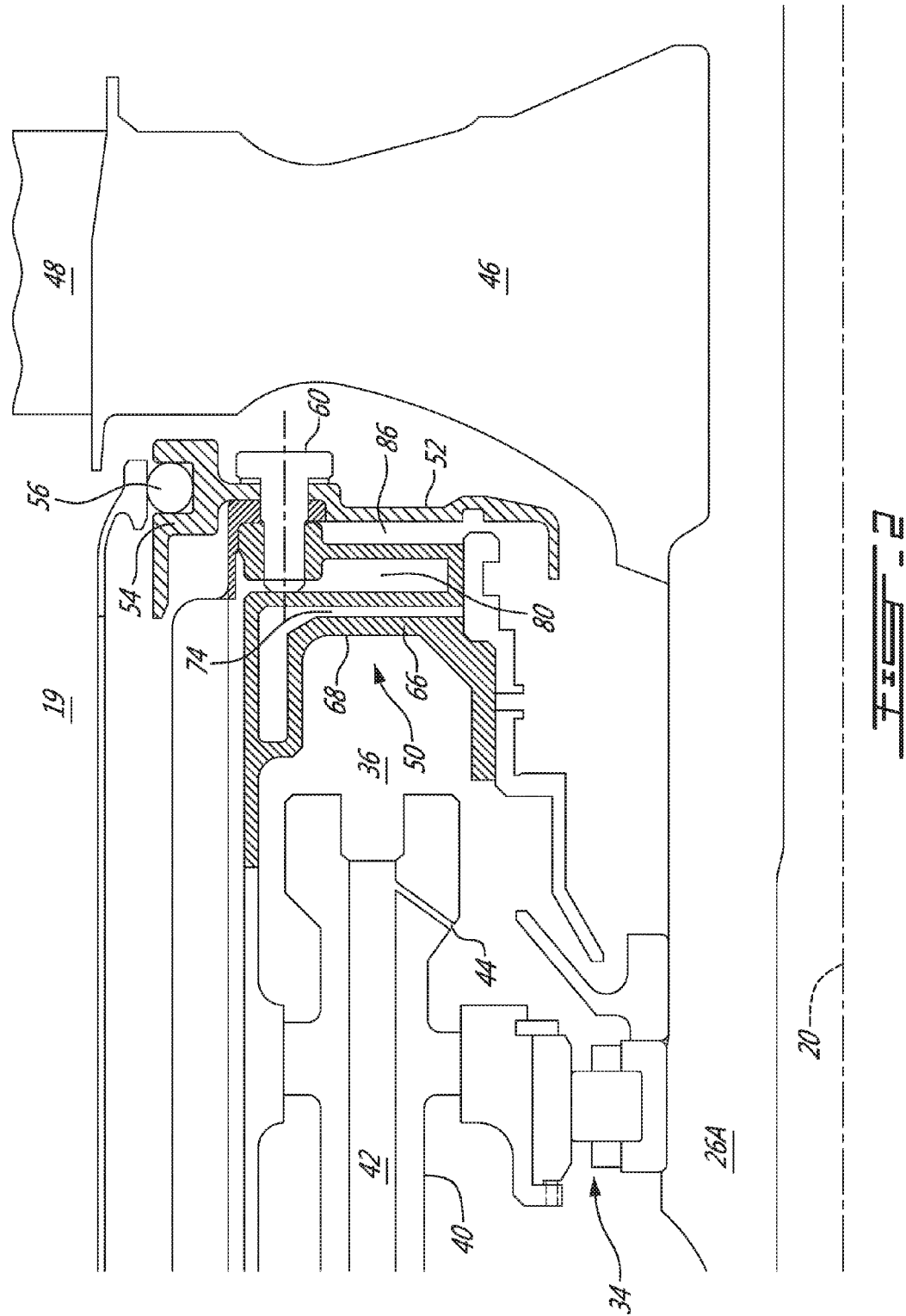
FIG. 2 is a schematic axial cross-sectional view of an exemplary bearing cavity in the gas turbine engine of FIG. 1.

FIG. 2 is a schematic axial cross-sectional view of an exemplary bearing cavity 36 axially spaced from a heat source 46 in gas turbine engine 10, with a housing 50 as described herein defining at least a portion of bearing cavity 36. Bearing cavity 36 may contain bearing 34, which may, for example, rotatably support high-pressure shaft 26A of high-pressure spool 26 for rotation about rotational axis 20. Bearing cavity 36 may be defined by one or more walls of housing 50. Bearing cavity 36 may be sized and dimensioned such that it may contain bearing 34 and optionally one or more other bearings or other devices.

Bearing cavity 36 may comprise an oil delivery line 40 for delivering oil to bearing 34 in order to cool and lubricate bearing 34 during operation of gas turbine engine 10. Oil delivery line 40 may comprise a channel 42 and a nozzle 44. Channel 42 may fluidly connect an oil source (not shown) outside of bearing cavity 36 with nozzle 44. As depicted in FIG. 2, a portion of oil delivery line 40 comprising nozzle 44 may extend into bearing cavity 36. Nozzle 44 may be directed generally towards bearing 34. During operation, the oil inside of bearing cavity 36 may become in contact with the walls of housing 50.

Bearing cavity 36 and its walls (which may include an inner surface 68 of a radial wall portion 66 of housing 50, as discussed in greater detail below with respect to FIG. 3) may have a certain temperature, which may depend on the conditions surrounding bearing cavity 36. For example, gas turbine engine 10 may comprise one or more heat sources 46 in proximity to bearing cavity 36 and which may have a relatively high temperature during and/or shortly after operation of gas turbine engine 10. For example, during operation of gas turbine engine 10, the temperature of heat source 46 may rise to a relatively high temperature and the temperature of heat source 46 may remain at a relative high temperature for some time after shut-down of gas turbine engine 10 as it cools down. Due to the temperature difference between heat source 46 and bearing cavity 36 and its walls, heat may tend to be transferred from heat source 46 to bearing cavity 36 and its walls. In some embodiments, heat source 46 and bearing cavity 36 may be disposed axially relative to each other in relation to rotational axis 20 as depicted in FIG. 2. In such embodiments, heat transfer from heat source 46 to bearing cavity 36 may occur generally along rotational axis 20 (see arrow H in FIGS. 3 and 4).

The temperature of bearing cavity 36 and its walls may increase due to heat transfer from heat source 46 via conduction, convection, and/or radiation depending on the nature of heat source 46 and its relationship to bearing cavity 36. In some embodiments, the temperature of bearing cavity 36 and its walls may increase due to heat transfer from more than one heat source 46.

In some embodiments, heat source 46 may, for example, be a hub of a turbine disk or other component(s) of gas turbine engine 10 that may store heat (e.g., serve as a thermal mass) or generate heat. Heat source 46 may, for example, be the hub of a stage of high-pressure turbine 28 or low-pressure turbine 32.

Figure 3:
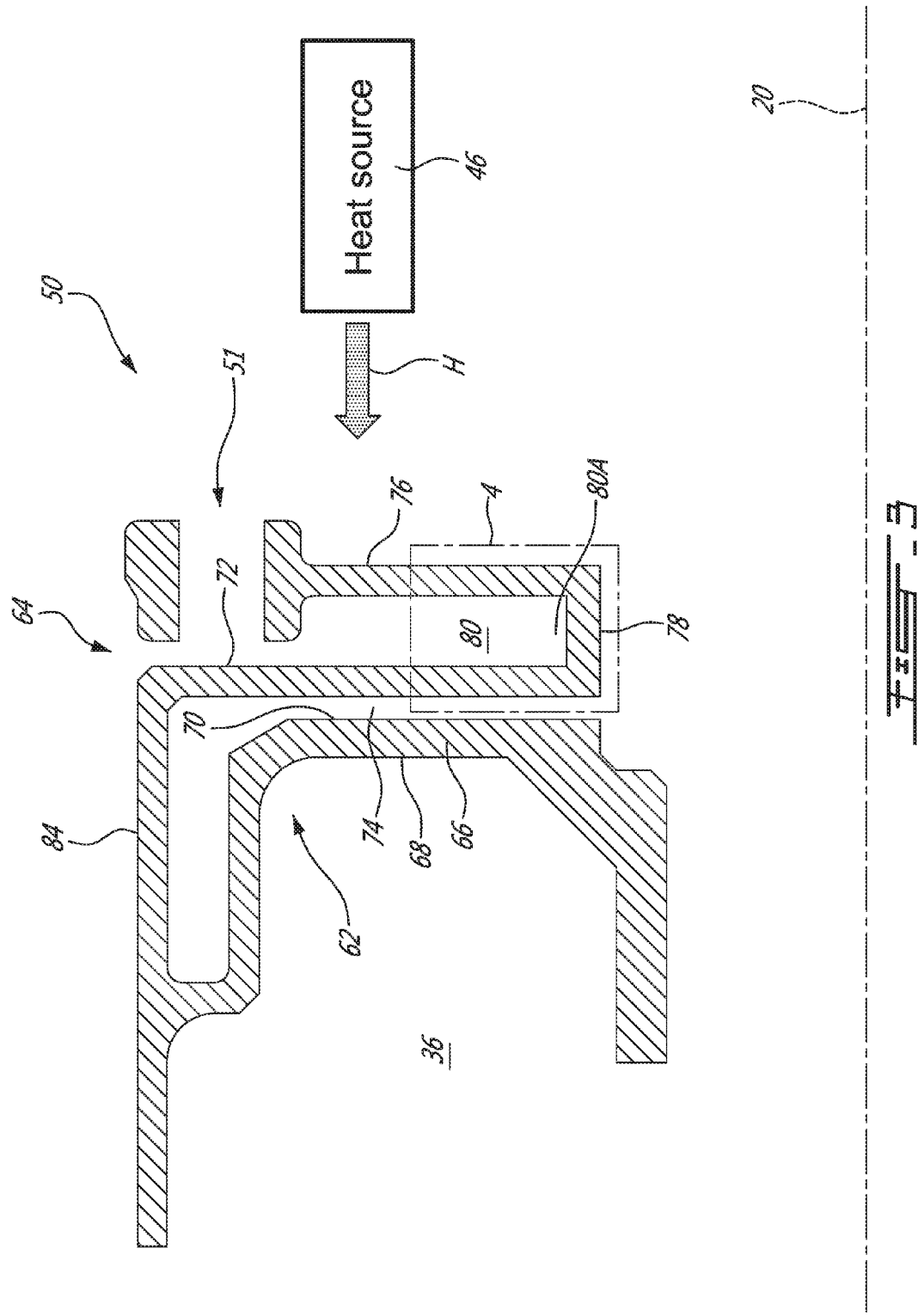
FIG. 3 is a schematic axial cross-sectional view of an exemplary housing of the bearing cavity of FIG. 2.

As depicted in FIG. 2, gas turbine engine 10 may comprise a housing 50, described in greater detail with respect to FIG. 3, for mitigating heat transfer to bearing cavity 36 from heat source 46 disposed axially from bearing cavity 36 relative to rotational axis 20 during operation of gas turbine engine 10. In some embodiments, housing 50 may be configured to reduce the risk of inner surface 68 of housing 50 reaching excessively high temperatures and consequently reduce the risk of overheating the oil inside bearing cavity 36.

In some embodiments, gas turbine engine 10 may comprise an optional heat shield 52 as a further barrier to heat transfer from heat source 46 to bearing cavity 36. Heat shield 52 may comprise a seal support 54 for supporting a suitable (e.g., rope) seal 56 that serves as an interface between heat shield 52 and an inner shroud of gas path 19. Heat shield 52 may be fastened to housing 50 via one or more fasteners 60 or may be secured to some other stationary internal structure of gas turbine engine 10, for example. In some embodiments, housing 50 may comprise one or more (e.g., threaded) holes 51 (shown in FIG. 3) for receiving fastener 60 therein.

FIG. 3 is a schematic axial cross-sectional view of housing 50 for mitigating heat transfer to bearing cavity 36 from heat source 46 disposed axially from bearing cavity 36 relative to rotational axis 20 during operation. Housing 50 may have a housing axis that may correspond to (i.e., be coaxial with) rotational axis 20 in some embodiments. Housing 50 may comprise a housing wall 62 and an annular flange 64.

Housing wall 62 may comprise a generally radial wall portion 66 relative to rotational axis 20. Housing wall 62 may have an inner surface 68 facing an interior of bearing cavity 36 and an outer surface 70 facing toward heat source 46 during operation of gas turbine engine 10. As depicted in FIG. 3, radial wall portion 66 may extend generally perpendicularly relative to rotational axis 20. However, in some embodiments, radial wall portion 66 may extend at a non-perpendicular angle to rotational axis 20. In some embodiments, housing wall 62 may define at least a portion of bearing cavity 36. For example, inner surface 68 of housing wall 62 may be exposed to an interior of bearing cavity 36.

Annular flange 64 may be joined to housing wall 62. Annular flange 64 may comprise one or more features that hinder heat transfer from heat source 46 to bearing cavity 36 along rotational axis 20. For example, annular flange 64 may define a relatively long (e.g., and tortuous) conductive heat transfer path to the housing wall 62 and also define one or more spaces that hinder the heat transfer to housing wall 62. It is understood that FIG. 3 illustrates an axial cross-sectional view of housing 50 and that housing wall 62 and annular flange 64 extend circumferentially about rotational axis 20. It is understood that housing wall 62 and annular flange 64 may have a substantially circumferentially uniform or a circumferentially non-uniform cross-sectional profile about rotational axis 20.

Annular flange 64 may comprise a first flange wall 72 that may extend generally radially relative to rotational axis 20. First flange wall 72 may be joined to housing wall 62 and axially spaced apart from housing wall 62 relative to rotational axis 20 (i.e., away from bearing cavity 36).

Radial wall portion 66 of housing wall 62 and first flange wall 72 may define a first space 74 between radial wall portion 66 of housing wall 62 and the first flange wall 72. In some embodiments, first space 74 may be hollow or contain an insulating material and hinder heat transfer along rotational axis 20 (e.g., in the direction of arrow H). As depicted in FIG. 3, first flange wall 72 may extend generally perpendicularly relative to rotational axis 20. However, in some embodiments, first flange wall 72 may extend at a non-perpendicular angle relative to rotational axis 20.

In some embodiments, first space 74 may be circumferentially continuous about rotational axis 20. That is, first space 74 may be an uninterrupted cavity that may not comprise dividers or ribs that may circumferentially separate first space 74 into two or more spaces. In some embodiments, a portion of first space 74 may have an axial cross-section that may be substantially circumferentially uniform about rotational axis 20.

Annular flange 64 may comprise a second flange wall 76 that may extend generally radially relative to rotational axis 20. Second flange wall 76 may be joined to first flange wall 72 at a thermally conductive junction 78. Second flange wall 76 may extend generally radially and may be axially spaced apart from first flange wall 72 relative to rotational axis 20 to define a second space 80 between first flange wall 72 and second flange wall 80. As depicted in FIG. 3, second flange wall 76 may extend generally perpendicularly relative to rotational axis 20. However, in some embodiments, second flange wall 76 may extend at a non-perpendicular angle relative to rotational axis 20.

In some embodiments, second space 80 may also be hollow or contain some thermally insulating material to hinder heat transfer along rotational axis. In some embodiments, second space 80 may be circumferentially continuous about rotational axis 20. That is, second space 80 may be an uninterrupted cavity that may not comprise dividers or ribs that may circumferentially separate second space 80 into two or more spaces. In some embodiments, a portion of second space 80 may have an axial cross-section that may be substantially circumferentially uniform about rotational axis 20.

In some embodiments, as depicted in FIG. 3, housing wall 62 and flange 64 may together define a generally s-shaped axial cross-sectional profile.

Figure 4:
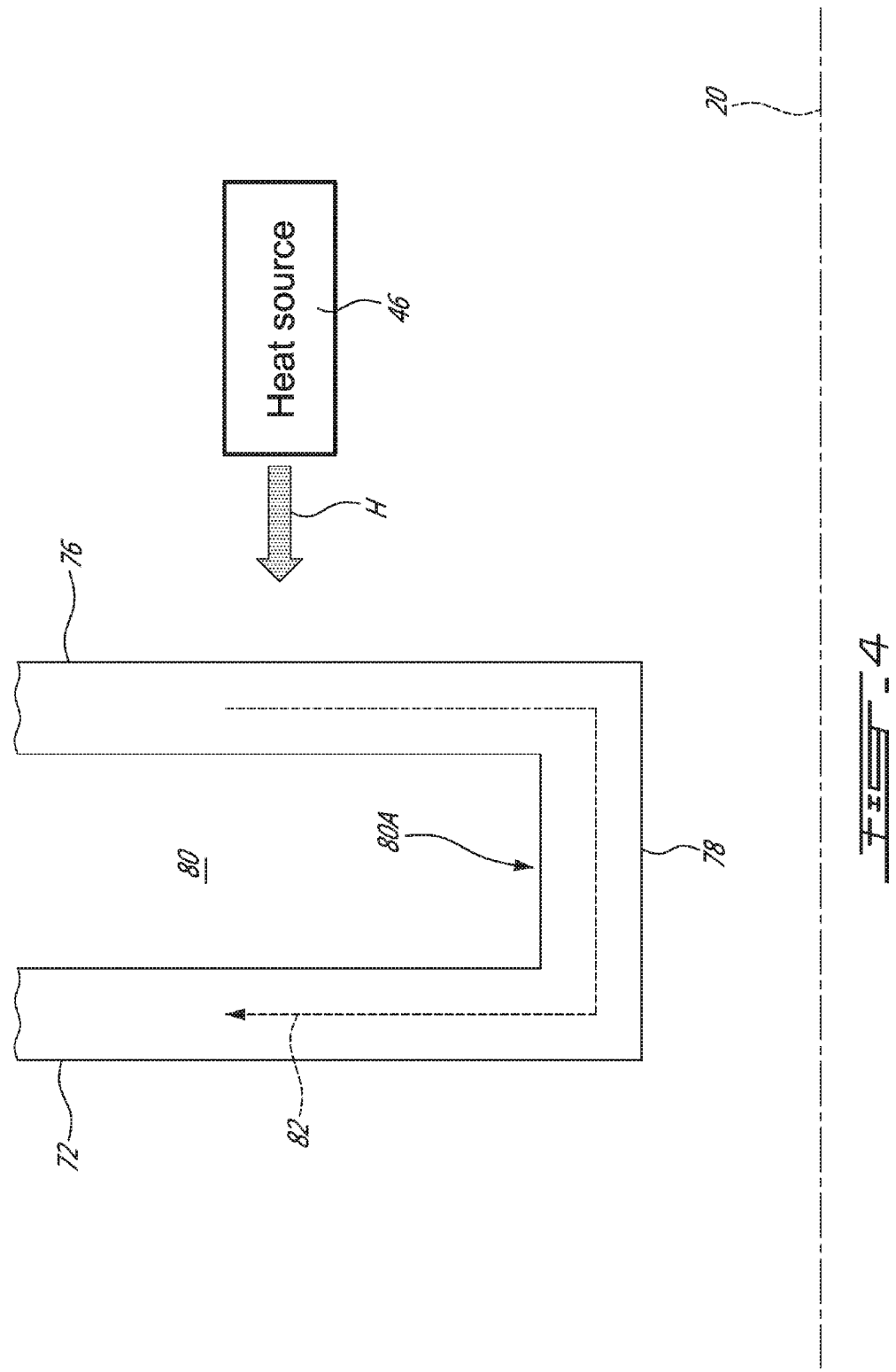
FIG. 4 is an enlarged schematic axial cross-sectional view of a portion of the housing of FIG. 3 identified using window 4 in FIG. 3.

FIG. 4 is an enlarged schematic axial cross-sectional view of a portion of housing 50 identified by window 4 shown in FIG. 3. FIG. 4 depicts second flange wall 76 and first flange wall 72 of housing 50 joined at thermally conductive junction 78. For clarity, only junction 78, a portion of second flange wall 76, a portion of first flange wall 72, and a portion of second space 80 are depicted, and other components of housing 50 are omitted. Junction 78 may be disposed at a radially inner end 80A of second space 80 to define first conductive heat transfer path 82 from second flange wall 76 to first flange wall 72 via thermally conductive junction 78. In some embodiments, thermally conductive junction 78 between first flange wall 72 and second flange wall 76 may be circumferentially continuous about rotational axis 20. Accordingly, heat may be transferred by conduction from second flange wall 76, through junction 78, and to first flange wall 72. As depicted in FIG. 4, first conductive heat transfer path 82 may be a circumferentially continuous (i.e., uninterrupted) conductive heat transfer path from second flange wall 76, through junction 78, and to first flange wall 72. In some embodiments, second flange wall 76 and first flange wall 72 may be joined only at junction 78 between second flange wall 76 and first flange wall 72, such that conductive heat transfer may occur from second flange wall 76 to first flange wall 72 exclusively through junction 78.

In some embodiments, annular flange 64 may be joined to housing wall 62 to define a second conductive heat transfer path similar to first conductive heat transfer path 82, such that second conductive heat transfer path may be a continuous conductive heat transfer path. That is, heat may be transferred by conduction from annular flange 64, for example, from first flange wall 72 to housing wall 62.

In reference to FIG. 3 again, housing 50 may comprise a first joining wall 84, which may join housing wall 62 and first flange wall 72 of annular flange 64. As depicted, first joining wall 84 may be generally parallel to rotational axis 20. In some embodiments, a conductive heat transfer path may be defined by annular flange 64 joined to housing wall 62 by first joining wall 84, such that a continuous, relatively long and tortuous (e.g., S-shaped, serpentine) conductive heat transfer path may be defined from second flange wall 76 to housing wall 62 via thermally conductive junction 78, first flange wall 72 and first joining wall 84. In some embodiments, annular flange 64, for example, first flange wall 72, and housing wall 62 may be joined only at first joining wall 84, such that conductive heat transfer may occur from annular flange 64, for example, first flange wall 72, to housing wall 62 exclusively through first joining wall 84.

In some embodiments, junction 78 may comprise a second joining wall similar to first joining wall 84, such that the second joining wall may join second flange wall 76 to first flange wall 72 at a radially inner end 80A of second space 80. The second joining wall may be generally parallel to rotational axis 20. In some embodiments, second flange wall 76 and first flange wall 72 may be joined only at the second joining wall, such that conductive heat transfer may occur from second flange wall 76 to first flange wall 72 exclusively through the second joining wall (i.e., junction 78).

In some embodiments, housing 50 or at least a portion of housing 50 may be generally axisymmetric about rotational axis 20. In some embodiments, first flange wall 72 and/or second flange wall 76 may be generally axisymmetric about rotational axis 20. While an axial cross-sectional view of housing 50 is depicted herein, it is understood that housing 50 or one or more portions thereof (e.g., housing wall 62, first joining wall 84, first flange wall 72, junction 78 and/or second flange wall 76) may be generally annular about the rotational axis 20.

A radially outer portion of second flange wall 76 may comprise one or more holes 51, which may be disposed and circumferentially spaced apart about rotational axis 20.

During operation, heat may be radiated from heat source 46 to second flange wall 76 or to optional heat shield 52. Alternatively, heat may be transferred to second flange wall 76 or to optional heat shield 52 by convection or conduction. First space 74 and second space 80, respectively defined between radial wall portion 66 and first flange wall 72 and between first flange wall 72 and second flange wall 76, may serve as buffer cavities providing resistance to heat transfer to bearing cavity 36 along rotational axis 20.

In the presence of optional heat shield 52, second flange wall 76 of housing 50 and heat shield 52 may define a third space 86 (shown in FIG. 2) which may be hollow or which may contain a thermally insulating material. Third space 86 may, similarly to first space 74 and second space 80, serve as a buffer cavity resisting heat transfer to bearing cavity 36 along rotational axis 20. In some embodiments, first space 74, second space 80 and third space 86 may be disposed in series along rotational axis 20 and between heat source 46 and bearing cavity 36 along arrow H.

Heat may be transferred from heat source 46 to bearing cavity 36 by radiation. Annular flange 64 and optional heat shield 52 may reduce or substantially eliminate direct radiation heat transfer from heat source 46 to bearing cavity 36. In various embodiments, housing 50 may comprise features that may mitigate heat transfer from heat source 46 to bearing cavity 36 and reduce the risk of overheating the oil inside of bearing cavity 36.

In some embodiments, housing 50 may be fabricated according to known or other manufacturing methods using suitable material(s). For example, housing 50 or part(s) thereof may be forged, cast, or machined. In some embodiments, housing 50 may comprise a plurality of components separately fabricated and subsequently assembled together by welding for example. Alternatively, in some embodiments, housing wall 62 and annular flange 64 may be integrally formed such that housing 50 may have a unitary (i.e. single-piece) construction.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A gas turbine engine comprising a housing for a bearing cavity having a bearing rotatably supporting a shaft having a rotational axis, the housing having a wall extending generally radially relative to the rotational axis with an inner surface facing an interior of the bearing cavity and an outer surface in use facing an engine heat source, the housing having an annular flange including:
   a first flange wall extending generally radially and being axially spaced apart from the radial housing wall relative to the rotational axis to define a first space between the radial housing wall and the first flange wall;
   a second flange wall extending generally radially and being axially spaced apart from first flange wall relative to the rotational axis to define a second space between the first flange wall and the second flange wall; and
   a thermally conductive junction between the second flange wall and the first flange wall, the junction being disposed at a radially inner end of the second space to define a conductive heat transfer path between the second flange wall and the first flange wall.

2. The gas turbine engine as defined in claim 1, wherein the second space is circumferentially continuous about the rotational axis.

3. The gas turbine engine as defined in claim 1, wherein a portion of the second space has an axial cross-sectional profile that is circumferentially uniform about the rotational axis.

4. The gas turbine engine as defined in claim 1, wherein a portion of the first space has an axial cross-sectional profile that is circumferentially uniform about the rotational axis.

5. The gas turbine engine as defined in claim 1, wherein the radial housing wall and the flange together define a generally s-shaped axial cross-sectional profile.

6. The gas turbine engine as defined in claim 1, wherein the radial housing wall and the first flange wall are joined via a joining wall that is generally parallel to the rotational axis.

7. The gas turbine engine as defined in claim 1, wherein the junction comprises a joining wall extending between the second flange wall and the first flange wall.

8. The gas turbine engine as defined in claim 1, wherein the junction is circumferentially continuous about the rotational axis.

9. The gas turbine engine as defined in claim 1, wherein the heat source is a turbine disk.

10. The gas turbine engine as defined in claim 1, comprising a heat shield being axially spaced apart from the second flange wall to define a third space between the second flange wall and the heat shield.

11. A housing for a bearing cavity in a gas turbine engine where the bearing cavity has a bearing rotatably supporting a shaft having a rotational axis, the housing having a housing axis corresponding to the rotational axis, the housing mitigating heat transfer to the bearing cavity from a heat source disposed axially from the bearing cavity relative to the housing axis during use, the housing comprising:
- a wall extending generally radially relative to the housing axis, the radial housing wall having an inner surface facing an interior of the bearing cavity and an outer surface facing toward the heat source during use; and
- an annular flange, the flange comprising:
  - a first flange wall extending generally radially and being axially spaced apart from the radial housing wall relative to the housing axis to define a first space between the radial housing wall and the first flange wall;
  - a second flange wall extending generally radially and being axially spaced apart from the first flange wall relative to the housing axis to define a second space between the first flange wall and the second flange wall; and
  - a thermally conductive junction between the second flange wall and the first flange wall, the junction being disposed at a radially inner end of the second space to define a conductive heat transfer path between the second flange wall and the first flange wall.

12. The housing as defined in claim 11, wherein the second space is circumferentially continuous about the housing axis.

13. The housing as defined in claim 11, wherein a portion of the second space has an axial cross-sectional profile that is circumferentially uniform about the housing axis.

14. The housing as defined in claim 11, wherein a portion of the first space has an axial cross-sectional profile that is circumferentially uniform about the housing axis.

15. The housing as defined in claim 11, wherein the radial housing wall and the flange together define a generally s-shaped axial cross-sectional profile.

16. The housing as defined in claim 11, wherein the conductive heat transfer path extends continuously through the flange from the second flange wall to the radial housing wall.

17. The housing as defined in claim 11, wherein the radial housing wall and the first flange wall are joined via a joining wall that is generally parallel to the housing axis.

18. The housing as defined in claim 11, wherein the junction comprises a joining wall extending between the second flange wall and the first flange wall.

19. The housing as defined in claim 11, wherein the first flange wall is generally axisymmetric about the housing axis.

20. The housing as defined in claim 11, wherein the junction is circumferentially continuous about the housing axis.

* * * * *